United States Patent
Hankinson et al.

(10) Patent No.: US 12,409,871 B2
(45) Date of Patent: Sep. 9, 2025

(54) METHODS AND SYSTEMS FOR HOSE HANGER APPARATUS

(71) Applicant: Transportation IP Holdings, LLC, Norwalk, CT (US)

(72) Inventors: Stephen Hankinson, Mars, PA (US); Joe Steltzer, Pittsburgh, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 14 days.

(21) Appl. No.: 18/186,036

(22) Filed: Mar. 17, 2023

(65) Prior Publication Data

US 2023/0227080 A1 Jul. 20, 2023

Related U.S. Application Data

(63) Continuation-in-part of application No. 17/451,806, filed on Oct. 21, 2021, now Pat. No. 11,698,151.

(60) Provisional application No. 63/178,981, filed on Apr. 23, 2021.

(51) Int. Cl.
*B61G 5/08* (2006.01)
*F16L 3/00* (2006.01)

(52) U.S. Cl.
CPC ............. *B61G 5/08* (2013.01); *F16L 3/003* (2013.01)

(58) Field of Classification Search
CPC ............. F16L 3/14; E21F 17/02; B61G 5/08
USPC .............................. 248/58, 49–74.5
See application file for complete search history.

(56) References Cited

U.S. PATENT DOCUMENTS

| | | | |
|---|---|---|---|
| 470,698 A * | 3/1892 | Murdock | F16L 3/12 |
| | | | 248/74.1 |
| 472,962 A | 4/1892 | Collins | |
| 706,292 A * | 8/1902 | Beaton | F16L 3/14 |
| | | | 411/401 |
| 1,086,442 A | 2/1914 | Cornelius | |
| 1,600,756 A | 9/1926 | Fairbanks | |
| 1,728,560 A | 9/1929 | Goshorn | |
| 1,793,520 A | 2/1931 | Siptrott | |
| 2,064,744 A | 12/1936 | Hall | |
| 2,135,771 A | 11/1938 | Roof | |
| 2,291,148 A | 7/1942 | Carson | |
| 2,542,172 A | 2/1951 | Wold | |
| 2,664,612 A | 1/1954 | Winkelman | |
| 2,871,540 A | 2/1959 | Smith | |
| 2,872,141 A | 2/1959 | Hefner | |
| 2,919,946 A | 1/1960 | Miener | |
| 2,979,094 A | 4/1961 | Tokimoto | |
| 2,996,315 A | 8/1961 | Roth et al. | |
| 3,261,579 A * | 7/1966 | Engman | F16L 25/04 |
| | | | 180/311 |
| 3,335,472 A | 8/1967 | Imai | |
| 3,344,935 A | 10/1967 | Stewart et al. | |

(Continued)

OTHER PUBLICATIONS https://www.sunlu.com/blogs/products-knowledge/the-properties-of-tpu-material-and-its-application-in-3d-printing#:~: text=Flexibility%20and%20Elasticity&text=During%20stretching%2C%20TPU's%20soft%20segments,far%20surpassing%20that%20of%20PLA.*

(Continued)

*Primary Examiner* — Christopher Garft
(74) *Attorney, Agent, or Firm* — K&L Gates LLP

(57) ABSTRACT

Various methods and systems are provided for a hose hanger apparatus comprising an attachment clip, an elastic support connected to the attachment clip, a carabiner assembly connector connected to the elastic support, and a carabiner assembly connected to the carabiner assembly connector.

11 Claims, 11 Drawing Sheets

(56) References Cited

U.S. PATENT DOCUMENTS

| | | | | |
|---|---|---|---|---|
| 3,422,964 | A * | 1/1969 | Nadherny | B60T 17/046 24/598.5 |
| 3,567,041 | A * | 3/1971 | Seay | B61G 5/08 285/63 |
| 3,587,868 | A | 6/1971 | Yates | |
| 3,592,425 | A | 7/1971 | Randolph et al. | |
| 3,784,030 | A | 1/1974 | Chierici | |
| 3,933,377 | A | 1/1976 | Arrowood | |
| 4,069,836 | A | 1/1978 | Sowinski | |
| 4,099,702 | A | 7/1978 | Temple | |
| 4,133,561 | A | 1/1979 | Cannon et al. | |
| 4,215,881 | A | 8/1980 | Scott et al. | |
| 4,392,575 | A | 7/1983 | Baker et al. | |
| 4,519,564 | A * | 5/1985 | Nadherny | B60T 17/046 24/30.5 R |
| 4,520,662 | A | 6/1985 | Schmid | |
| 4,592,217 | A | 6/1986 | Fernandez et al. | |
| 4,665,858 | A | 5/1987 | Harrigal et al. | |
| 4,691,563 | A | 9/1987 | Martin | |
| 4,696,120 | A | 9/1987 | Schroeder | |
| 4,769,875 | A * | 9/1988 | Hartman | B60P 7/0823 428/68 |
| 4,876,885 | A | 10/1989 | Martin et al. | |
| 4,886,404 | A | 12/1989 | Jensen et al. | |
| 4,986,500 | A * | 1/1991 | Campbell | F16L 3/01 248/53 |
| 5,067,677 | A | 11/1991 | Miceli | |
| 5,131,269 | A | 7/1992 | Blosnick et al. | |
| 5,131,619 | A | 7/1992 | Daugherty et al. | |
| 5,176,350 | A | 1/1993 | McQuistian | |
| 5,287,739 | A | 2/1994 | Kingsbury | |
| 5,474,274 | A | 12/1995 | Bernosky | |
| 5,662,295 | A * | 9/1997 | Nadherny | F16L 3/14 248/58 |
| 5,937,570 | A | 8/1999 | Abdul-Raheem | |
| 6,141,839 | A | 11/2000 | Yong-Set | |
| D583,652 | S | 12/2008 | Vermesi et al. | |
| 7,757,995 | B2 | 7/2010 | McKiernan | |
| 7,780,022 | B2 | 8/2010 | Vermesi et al. | |
| 7,850,128 | B2 | 12/2010 | Murphy | |
| 8,066,231 | B2 | 11/2011 | McKiernan | |
| 8,167,251 | B2 * | 5/2012 | Murphy | B61G 5/06 248/302 |
| 8,201,779 | B2 * | 6/2012 | Hua | F16L 3/14 248/53 |
| 8,276,853 | B2 | 10/2012 | Murphy | |
| 9,365,220 | B2 | 6/2016 | Miner et al. | |
| 9,366,361 | B2 | 6/2016 | Miner et al. | |
| 9,366,362 | B2 * | 6/2016 | Maki | B61G 7/02 |
| D772,041 | S | 11/2016 | Miner et al. | |
| 9,625,060 | B2 * | 4/2017 | Maki | F16L 3/127 |
| 9,694,832 | B2 | 7/2017 | Foxx et al. | |
| 9,828,007 | B2 | 11/2017 | Miner et al. | |
| 10,281,060 | B2 | 5/2019 | Maki | |
| 2004/0155005 | A1 | 8/2004 | Murphy | |
| 2005/0251967 | A1 * | 11/2005 | McNeill | B65D 63/1027 24/16 PB |
| 2007/0227999 | A1 * | 10/2007 | Murphy | F16B 45/012 213/76 |
| 2008/0276432 | A1 * | 11/2008 | McNeill | B65D 63/1027 24/16 PB |
| 2011/0107558 | A1 * | 5/2011 | Hua | B60T 17/046 24/16 PB |
| 2012/0153536 | A1 * | 6/2012 | Coffield | F16F 1/46 267/153 |
| 2015/0158479 | A1 * | 6/2015 | Maki | F16L 3/14 267/71 |

OTHER PUBLICATIONS http://www.blackwellplastics.com/TPU.html#:~: text=Physical%20Properties%3A&text=Tensile%20Strength%20%2D%206960%20to%2012000,to%2010.1%20ft%2Dlb%2Fin.* https://www.lookpolymers.com/pdf/Natural-Rubber-Vulcanized-NR-IR-Polyisoprene.pdf.*

* cited by examiner

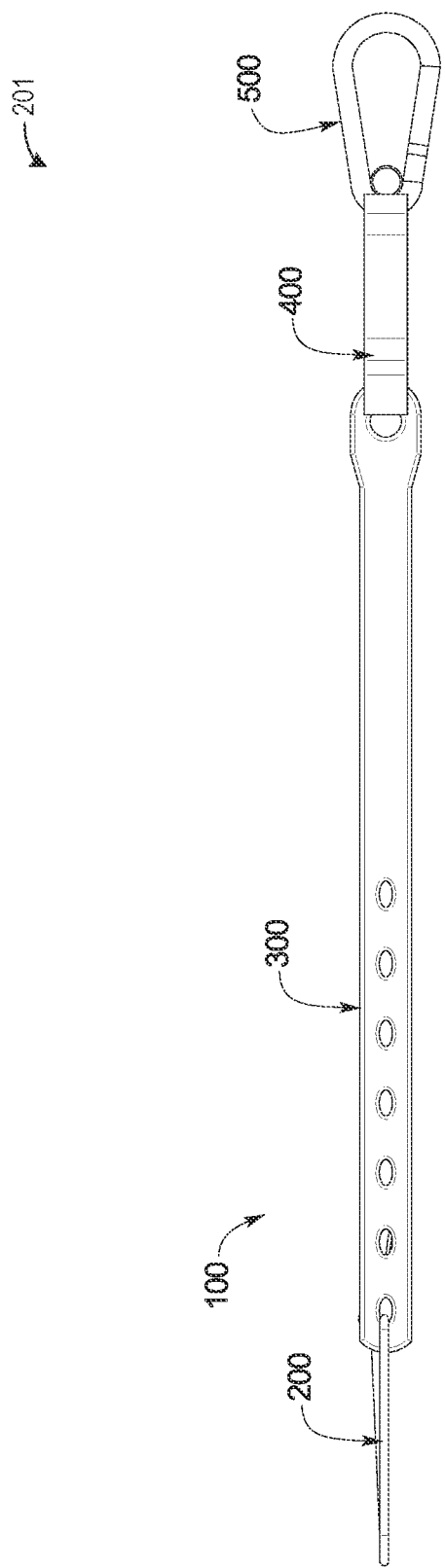
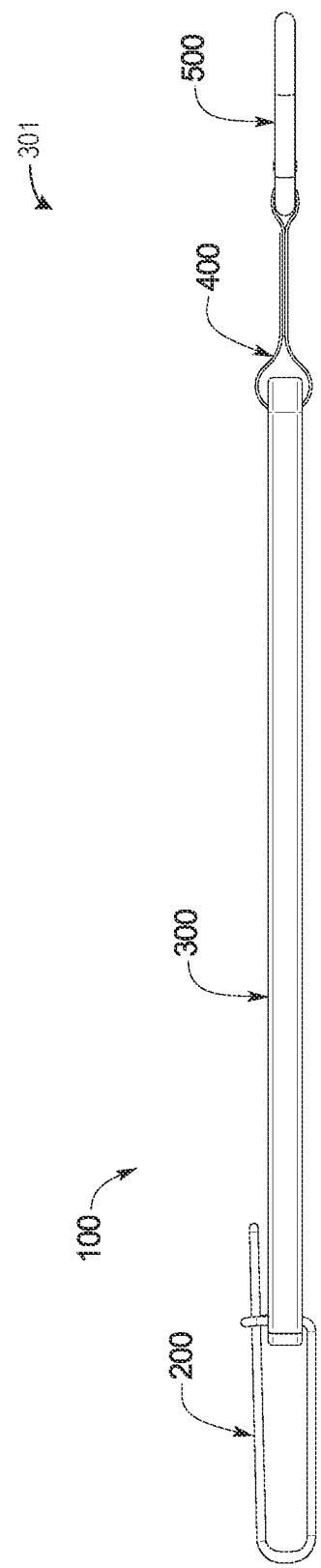
FIG. 2
FIG. 3

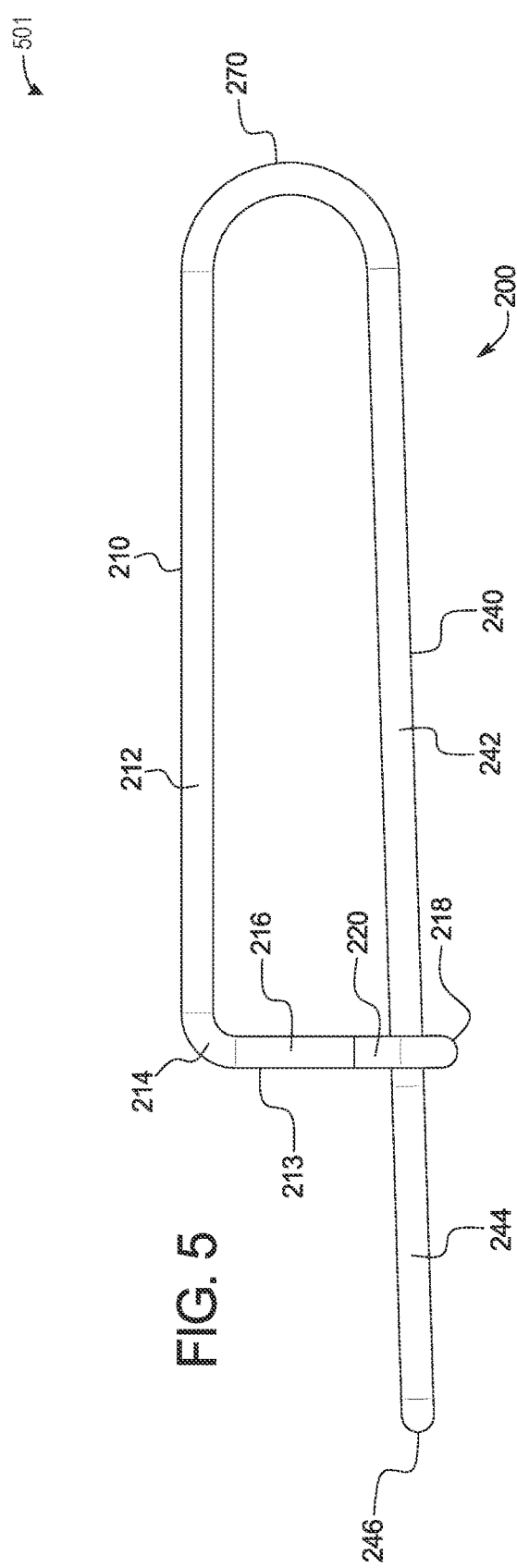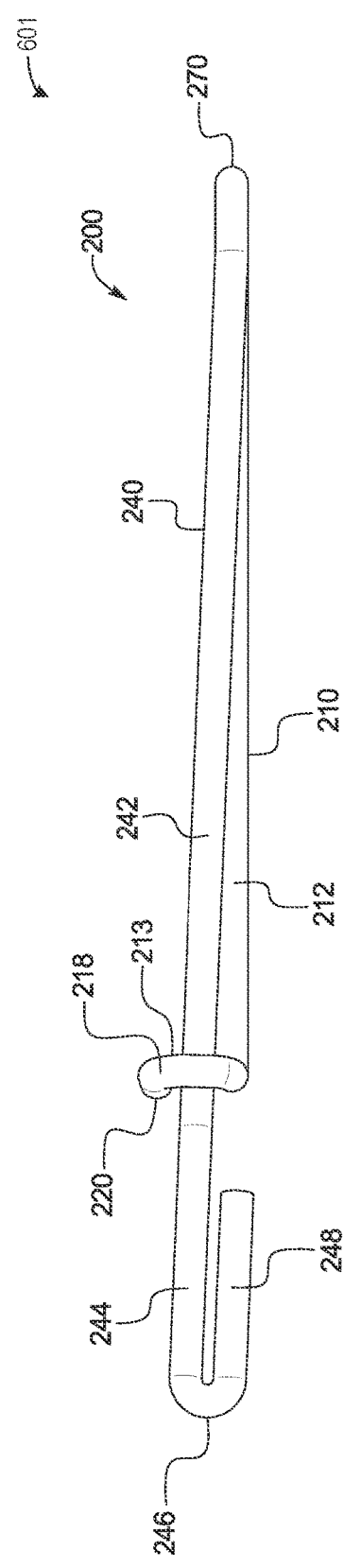
FIG. 5
FIG. 6

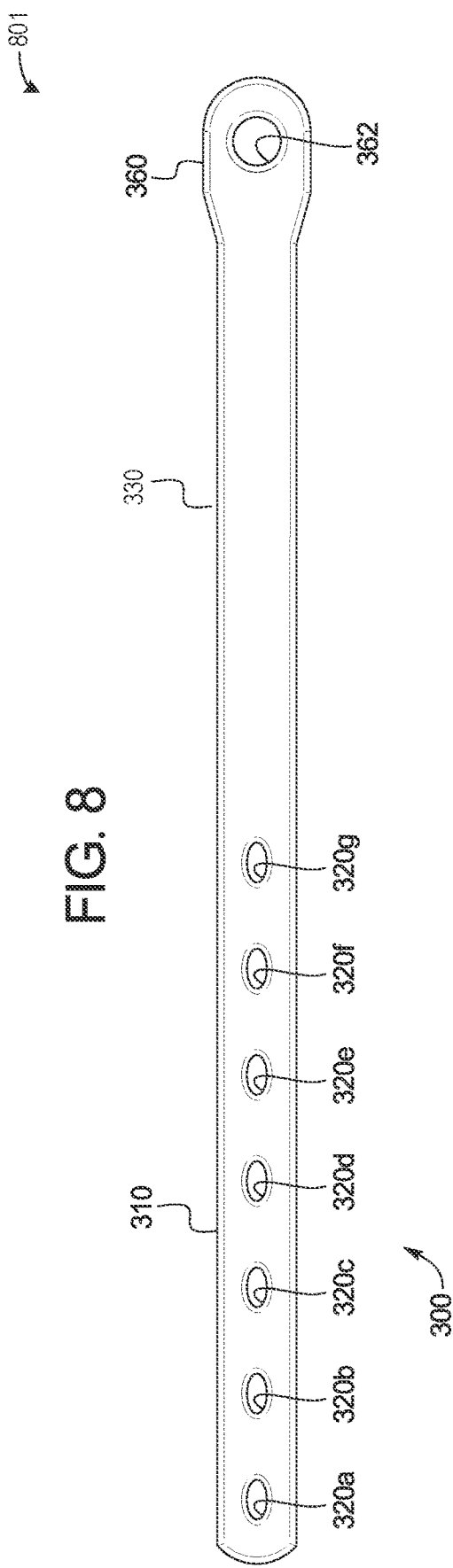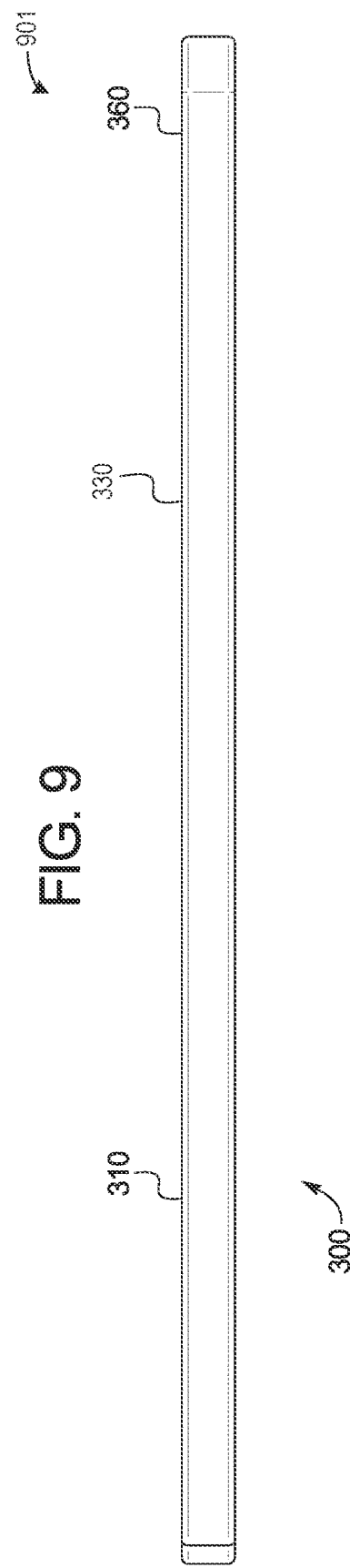

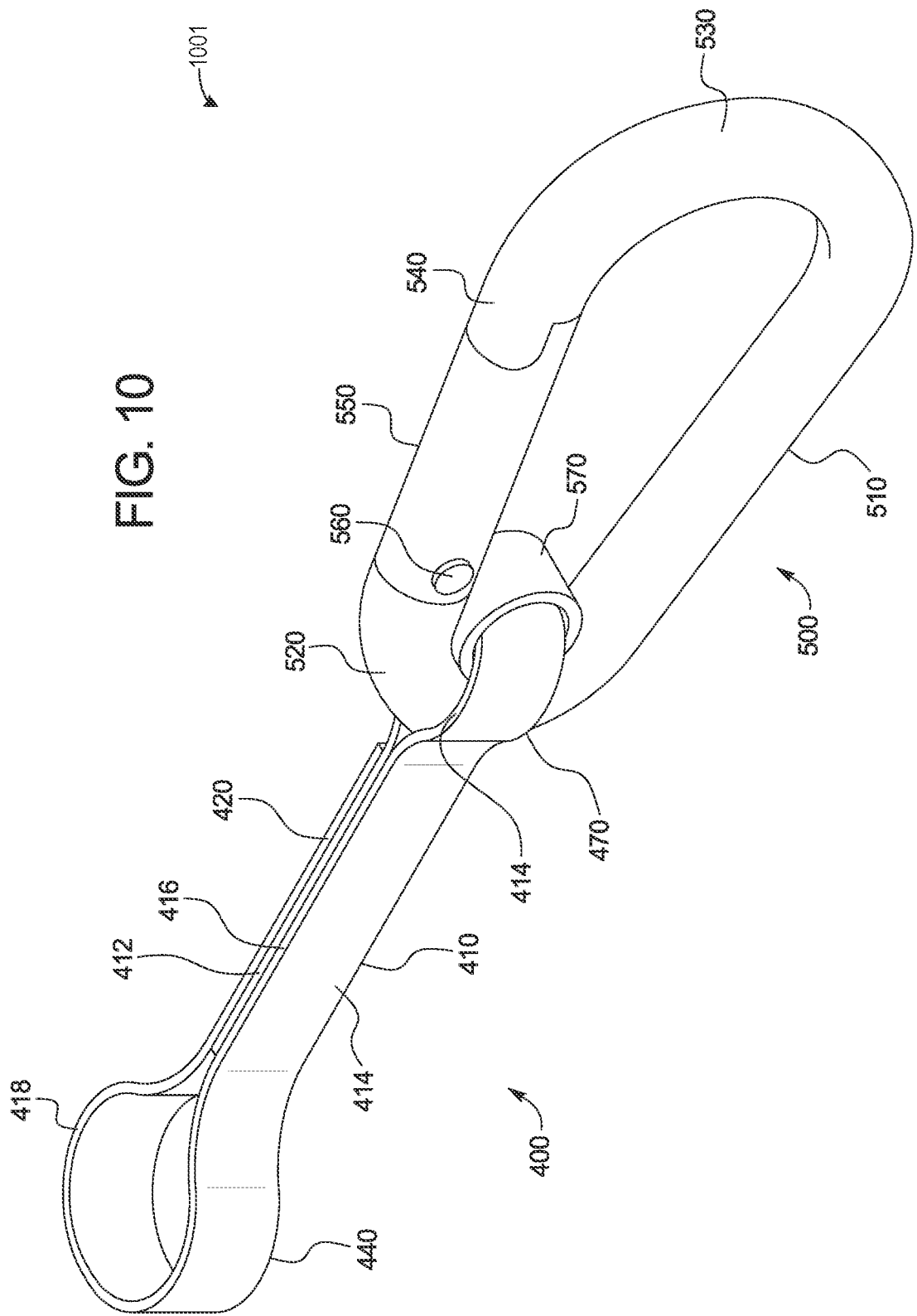

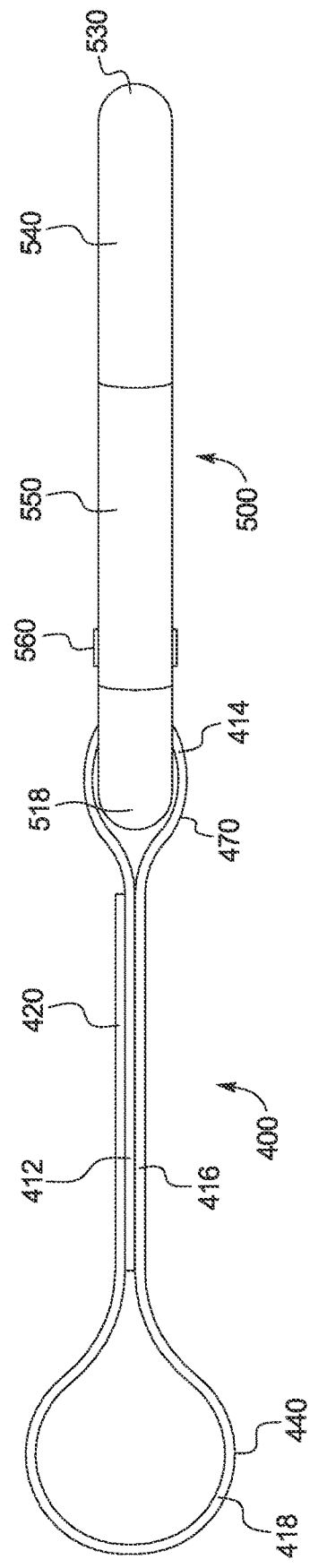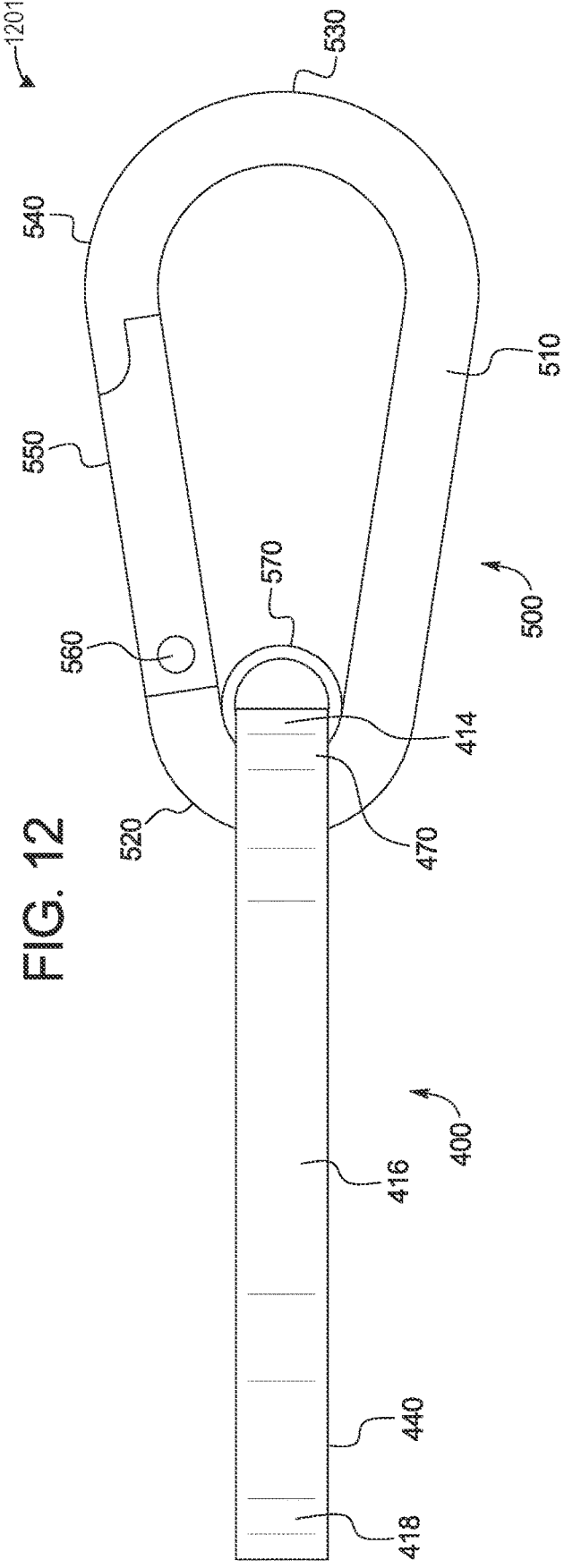

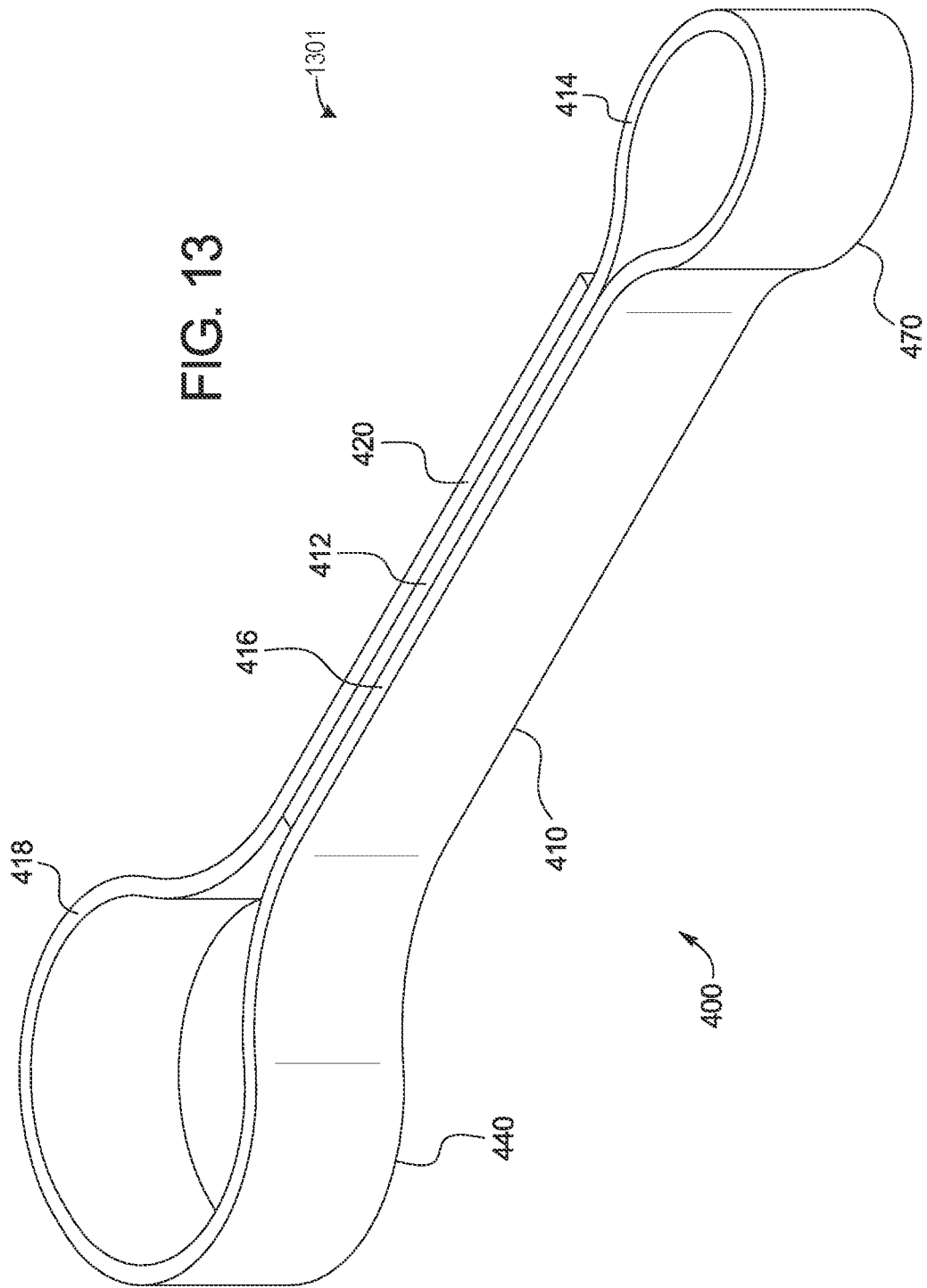

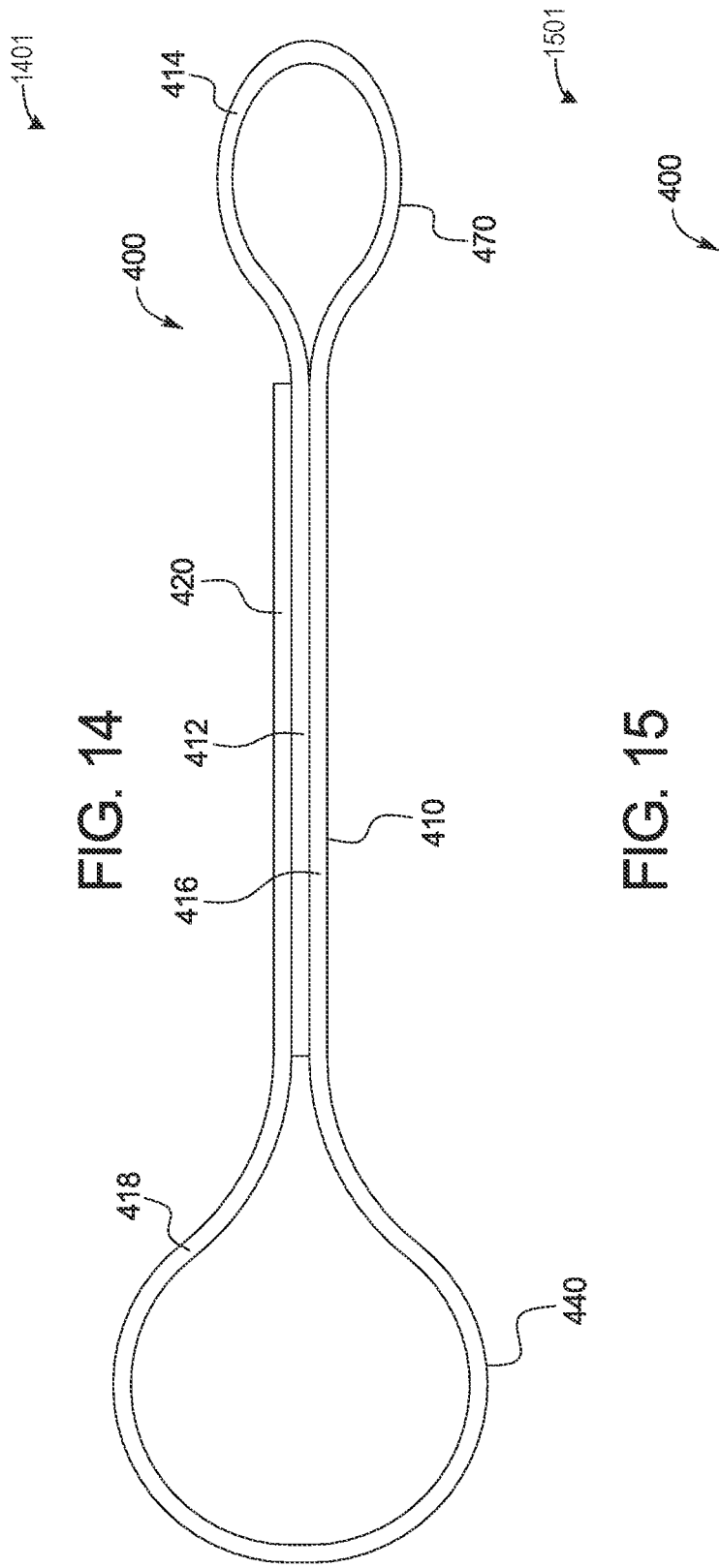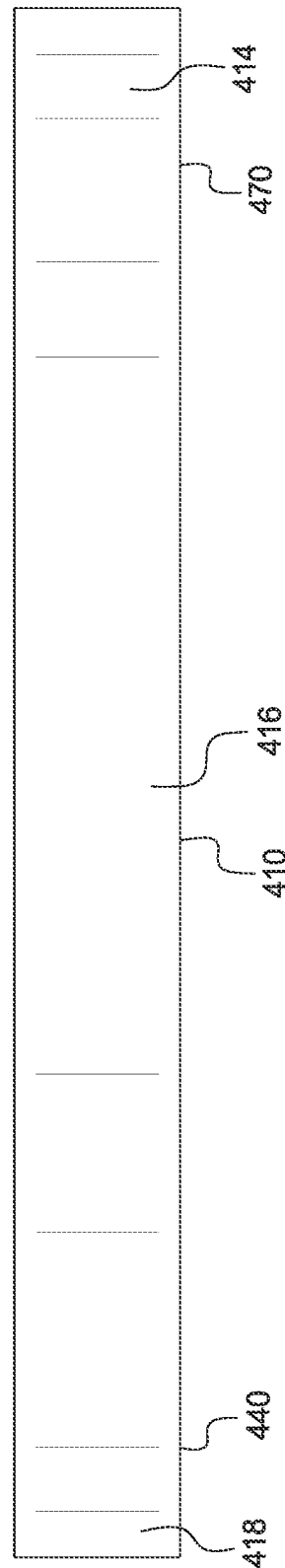

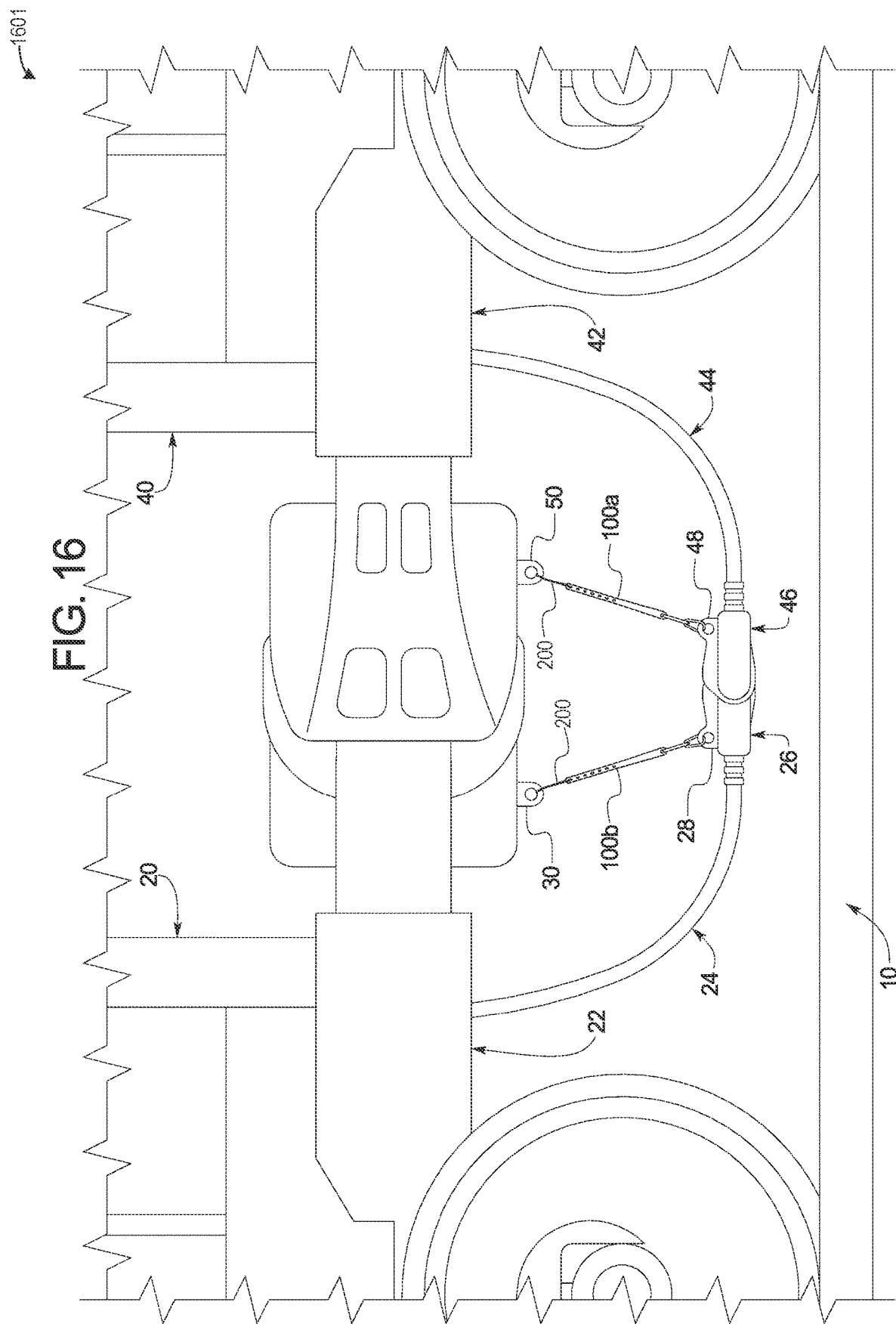

METHODS AND SYSTEMS FOR HOSE HANGER APPARATUS

The present application is a continuation-in-part of U.S. patent application Ser. No. 17/451,806, entitled "METHODS AND SYSTEMS FOR A HOSE HANGER APPARATUS," and filed on Oct. 21, 2021. U.S. patent application Ser. No. 17/451,806 claims priority to U.S. Provisional Application No. 63/178,981, entitled "METHODS AND SYSTEMS FOR A HOSE HANGER APPARATUS," and filed on Apr. 23, 2021. The entire contents of each of the above-listed application are hereby incorporated by reference for all purposes.

FIELD

Embodiments of the subject matter disclosed herein relate to hose suspension systems for multi-unit vehicles.

BACKGROUND

In a railway car coupler system, a supporting device may be used for suspending a glad hand of an air brake hose assembly from the couplers of railway vehicles. The supporting device, also called an air brake hose support or a hose strap, may be a metal chain whereby, one end of the chain may be connected to a fitting on the glad hand on a free end of the air hose and the other end may be connected to a fitting on the coupler of the railway vehicle. When a glad hand fitting becomes decoupled and the appropriate valves are not shut off, compressed air in the hose may propel the glad hand, which in turn exerts a load on the strap, referred to herein as "reaction force." A chain support may not absorb this energy when the glad hand fitting is decoupled, which may lead to increased reaction force. As a result, the full energy from the decoupling may be delivered to the impact when the glad hand fitting strikes the car or other machinery. The chain and connectors may also be susceptible to degradation (e.g., cracking), which may lead to the air hose being pulled along the trackway, or to the glad hand being caught in wayside equipment resulting in degradation to the air brake hose assembly. Thus, many commercially used hose hangers on vehicles may be replaced frequently (e.g., every six months). Accordingly, there is a demand to provide air hose hangers with a greater useful life.

BRIEF DESCRIPTION

Embodiments are disclosed for systems for a longer lasting hose hanger. In one embodiment, a system for a hose hanger comprises an attachment clip, an elastic support connected to the attachment clip, a carabiner assembly, and a carabiner assembly connector, wherein the carabiner assembly connector connected to the elastic support and the carabiner assembly.

Other objects, features, and advantages of the present disclosure will be apparent from the following detailed disclosure, taken in conjunction with the accompanying sheets of drawings, wherein like reference numerals refer to like parts. It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present disclosure will be better understood from reading the following description of non-limiting embodiments, with reference to the attached drawings, wherein below:

FIG. 2 shows a side view of the hose hanger of FIG. 1;

FIG. 3 shows a top view of the hose hanger of FIG. 1;

FIG. 5 shows an enlarged side view of the attachment clip of the hose hanger of FIG. 1;

FIG. 6 shows an enlarged top view of the attachment clip of the hose hanger of FIG. 1;

FIG. 8 shows an enlarged side view of the elastic support of the hose hanger of FIG. 1;

FIG. 9 shows an enlarged top view of the elastic support of the hose hanger of FIG. 1;

FIG. 10 shows an enlarged perspective view of the carabiner assembly connector and the carabiner assembly of the hose hanger of FIG. 1;

FIG. 11 shows an enlarged top view of the carabiner assembly connector of the hose hanger of FIG. 1;

FIG. 12 shows an enlarged side view of the carabiner assembly connector and the carabiner assembly of the hose hanger of FIG. 1;

FIG. 13 shows an enlarged perspective view of the carabiner assembly connector of the hose hanger of the FIG. 1;

FIG. 14 shows an enlarged top view of the carabiner assembly connector of the hose hanger of FIG. 1;

FIG. 15 shows an enlarged side view of the carabiner assembly connector of the hose hanger of FIG. 1; and FIG. 16 shows an enlarged side view of two connected railroad cars illustrating two hose hangers of FIG. 1 supporting two adjacent air hoses attached to the two connected railroad cars.

FIGS. 1-16 are shown approximately to scale.

DETAILED DESCRIPTION

Figure 1:
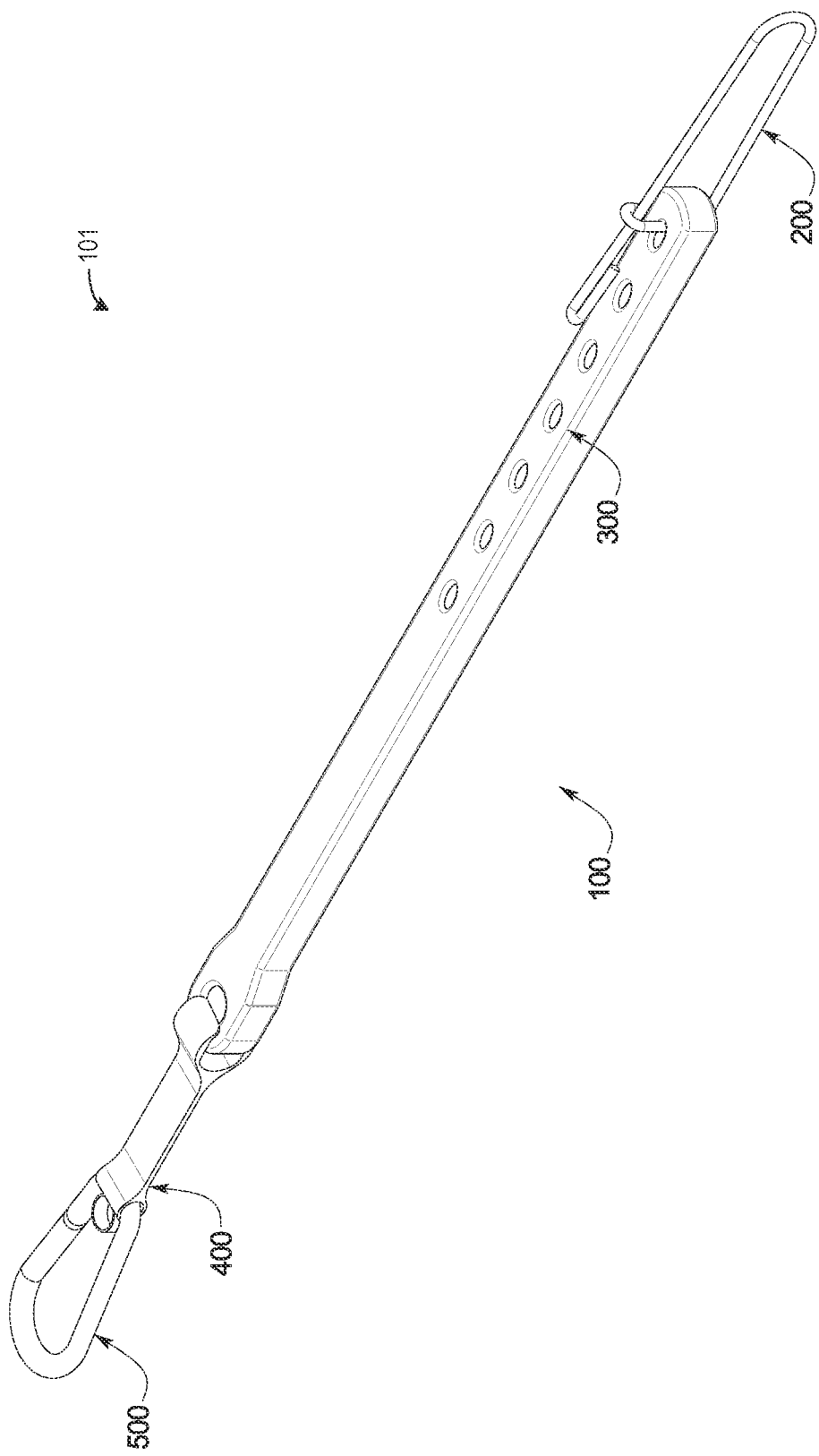
FIG. 1 shows a perspective view of a hose hanger of one example embodiment of the present disclosure.

Various known multi-unit vehicles (e.g., freight trains, passenger trains, semi-trucks with trailers) may include pneumatically controlled braking systems. Such braking systems may include air communication hoses extending the entire length of the vehicle (e.g., from a first train car to a second train car, from the tractor unit to the semi-trailer of a semi-truck, etc.). These hoses may extend outwardly from the front and/or back end of the units that comprise the multi-unit vehicle to adjacent vehicle units. For example, a first hose may extend from the back end of a railway engine car and connect to a second hose extending from the front end of an adjacent freight car, with a third hose extending from the back end of the adjacent freight car to connect to a fourth hose extending from the front end of an adjoining freight car, and so on within a freight train. The braking systems may further include glad hand connectors respectively attached to each end of each air communication hose. Each glad hand connector may be connectable with a respective glad hand connector at the end of the air hose of an adjacent vehicle unit. This facilitates the communication of pressurized air between adjacent units of the multi-unit vehicle and, thereby, operation of the local pneumatic braking system of each unit of the multi-unit vehicle. The air communication hoses may be constructed from rubber or other suitable flexible materials and the glad hand connectors may comprise steel.

Hose hangers may be used to maintain these air communication hoses and glad hand connectors suspended above a path along which the vehicles move. Each hanger may be attached to an upwardly extending fitting on the top of the glad hand connector and to a fitting extending downwardly from a part of the vehicle (such as a coupler of a railroad car). Each hose is thus suspended from the respective coupler in a manner such that the hose retains a certain desired freedom of movement with respect to the coupler. The hanger may provide limited movement of the hose to facilitate connection of the hose to the adjacent hose of the adjacent vehicle and movements of the vehicles. The hanger may be further configured to allow the hose to move as needed to avoid undesired uncoupling of the glad hand connectors of adjacent vehicles. The hanger may be further configured to allow movement of the hoses to facilitate uncoupling or disconnection when desired.

When adjacent vehicles are joined together, the respective glad hand connectors on the adjacent vehicles may be manually lifted by a worker to substantially horizontally extending aligned positions, connected to each other, and then released. After being released, the connected glad hand connectors may move or fall downwardly, which may result in the connection between the glad hands to be locked and secured. More specifically, when the glad hand connectors are in a horizontal or substantially horizontal position with respect to each other, the glad hand connectors are not locked into each other or secured together. When the glad hand connectors move downwardly and are positioned at an angle with respect to each other, the glad hand connectors become locked into each other and secured together. The hangers may block the respective hoses and glad hand connectors from falling too low and engaging the ground or path.

When adjacent vehicles, such as adjacent railroad cars, are separated from each other, the glad hand connectors may be automatically disconnected without user input. More specifically, when the adjacent vehicles move apart from each other, the hoses and the glad hand connectors move upwardly from the locked or secured lower position toward a more horizontal or substantially horizontal position with respect to each other to an unlocked position where the glad hand connectors are not locked into each other or secured together as explained above. During this process, the pressurized air in the air hoses, that may range from about 60 to about 90 PSI, may result in the hoses and the glad hand connectors to forcefully move and snap apart from each other. For example, when a force of the air pressure is greater than a force of the engagement between the glad hand connectors, the engagement force may decrease as the glad hand connectors move upwardly more toward the unlocked, upper horizontal position. The force of this disconnection between the glad hand connectors may result in each of the hoses and the respective glad hand connectors to undergo an amount of movement. The hoses and the glad hand connectors may move in multiple different directions. These movements, as a result of the force of the disconnection, may be uncontrolled and/or unpredictable, and may subject the hangers that hold the hoses and glad hand connectors to relatively extreme forces. While the respective hangers may partially control the movements of the hoses and glad hand connectors, when this forceful disconnection occurs between the glad hand connectors, it may degrade the hangers or parts thereof if the force is greater than a threshold force. In one example, the threshold force is based on a non-zero, positive number.

Inability to maintain rail car hoses at a desired height above the rail structure may lead to unintended air hose coupling separation, which may lead to an unintended braking event and stopping of the train and sometimes even derailment. The unintended braking event may be time-consuming and expensive due to a user (e.g., a crew member) walking the length of the train to identify and correct the uncoupling. When an uncoupled air hose is discovered, the crew member may reconnect the coupling members or initiate a repair before returning to the engine.

While hose hangers comprising chain, steel cable, or webbing may be used, the present disclosure teaches an elastomeric strap material configured to provide a more flexible connection than the chain, steel cable, or webbing. Elongated spring clips as fastener members may be provided for attachment of one of the ends of the strap to the vehicle body and the opposite end to an apertured fitting at the end of the air hose.

One issue with elongated spring clips was investigated following field service reports of air hose support straps in train systems that had degraded with bent or missing clips. The investigation revealed that over 95% of clip degradation occurred to the clip connecting the bottom of the support strap to the air hose glad hand fitting. From analysis of a number of clips produced by different manufacturers, it was observed that the degradation was a result of the clip being strained on the long sides of the clip (lateral loading) instead of along the long axis of the clip (longitudinal loading). Lateral loading occurs when the railroad car coupler is in the buff position as occurs when it is not under load. In this condition, the air hose support is slack, which allows a clip of prior art design to slide along its length through the glad hand aperture. When the coupler returns to the neutral or draft position, the load is applied to the side of the clip where it is weakest rather than its ends, bending the clip into an oblong or ovoid shape. Eventually, this causes the clip's locking integrity to be lost.

Thus, the hose hanger described herein provides a prolonged lifetime as compared to the prior art by eliminating the possibility of cross loading (e.g., lateral and longitudinal loading). Further, the hose hanger of the present disclosure provides a simpler means of attachment to the glad hand end as compared to the wire clips of the hose hangers of the prior art. Referring now to the drawings and particularly to FIGS. 1-16, a hose hanger of an example embodiment of the present disclosure is illustrated. In this illustrated embodiment, the hose hanger is configured to be employed for hanging an air hose of a railroad car. However, it should be appreciated that the hose hanger of the present disclosure can be otherwise suitably employed (e.g., the hose hanger may be used to hang hoses of other systems, the hose hanger may hang air hoses of pneumatically controlled braking systems in other multi-unit vehicles).

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure. Further, it should be noted that, the terms "first", "second", and the like in the description and in the claims, are used to distinguish between similar elements and do not tend to describe a particular sequential and chronological order.

FIGS. 1-16 will be described collectively. Referring now to FIG. 1, it shows a perspective view 101 of a hose hanger 100 of one example embodiment of the present disclosure. The hose hanger 100 may be comprised of an attachment clip 200, an elastic support 300 connected to the attachment clip 200, a carabiner assembly connector 400 connected to the elastic support 300, and a carabiner assembly 500 connected to the elastic support 300. In the illustrated embodiment, the attachment clip 200 and carabiner assembly 500 may be connectable to a coupler of a railroad car and a glad hand of an air hose of a railroad car, respectively. In some embodiments, the attachment clip 200 and carabiner assembly 500 may be connectable to other components of a hose assembly. FIG. 2 is a side view 201 of the hose hanger 100 and FIG. 3 is a top view 301 of the hose hanger 100.

Figure 4:
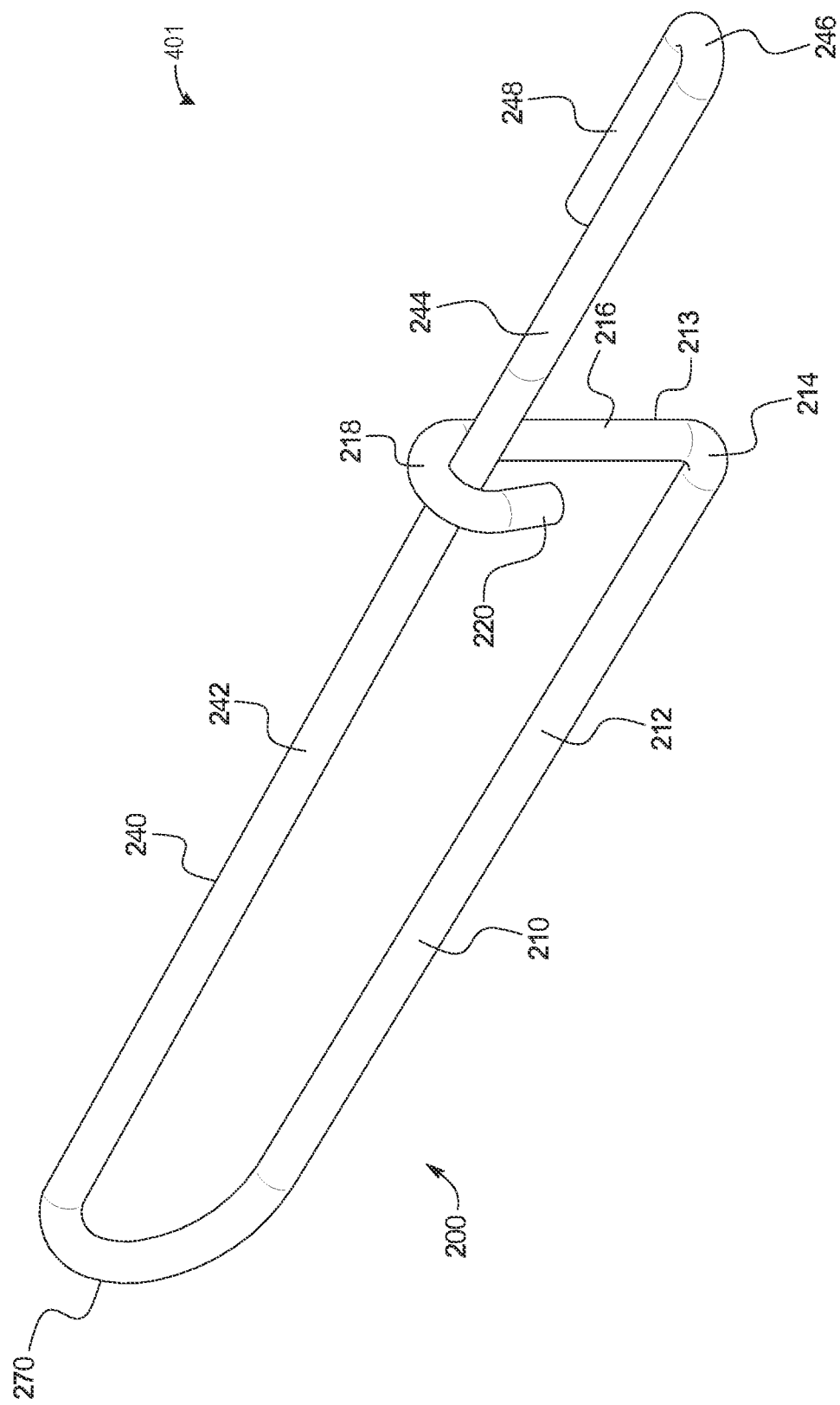
FIG. 4 shows an enlarged perspective view of the attachment clip of the hose hanger of FIG. 1.

Turning now to FIGS. 4 and 5, they show an enlarged perspective view 401 of the attachment clip 200 of the hose hanger 100 and an enlarged side view 501 of the attachment clip 200, respectively. The attachment clip 200 may be shaped into a modified V with hooked ends that may interlock. The attachment clip 200 may include a first arm 210, a second arm 240, and an arm connector 270 connecting the first arm 210 and the second arm 240. The first arm 210 may include an elongated first member 212 and a hook 213 integrally connected to and extending transversely to the first member 212. The hook 213 may include a first curved section 214 integrally connected to the first member 212, a first straight section 216 integrally connected to the first curved section 214, a second curved section 218 integrally connected to the first straight section 216, and a second straight section 220 integrally connected to the second curved section 218. The second arm 240 may include an elongated first member 242 and a lock (not separately labeled) integrally connected to and extending transversely to the first member 242. The lock may include a first straight section 244 integrally connected at a slight angle to the first member 242, a first curved section 246 integrally connected to the first straight section 244, and a second straight section 248 integrally connected to the first curved section 246.

The elongated first member 242 may extend through a hook of the of the first arm 210, wherein the hook is shaped via the first straight section 216, the second curved section 218, and the second straight section 220. A hook of the second arm 240, shaped via the first straight section 244, the first curved section 246, and the second straight section 248, may block inadvertent separation of the first and second arms. By doing this, the unintended stops described above may be avoided.

In FIGS. 1-6, the attachment clip 200 is shown in the closed/locked position. FIG. 6 is an enlarged top view 601 of the attachment clip of the hose hanger in the closed/locked position. An open/unlocked position may include where the first arm 210 and the second arm 240 are apart from one another such that the hooks do not intersect with elongated members of the opposing arm. The hook 213 of the first arm 210 may be configured to releasably hook on to and engage the second arm 240 when the attachment clip 200 is attached to a component (e.g., a part of a coupler of a railroad car) to secure the attachment clip 200 and the hose hanger 100 to the component. In the closed/locked position, the lock may prevent disengagement of the first arm 210 from the second arm 240. The attachment clip 200 may be comprised of a suitable material or materials in accordance with the present disclosure. In some embodiments, the attachment clip 200 may be comprised of a resiliently bendable wire (e.g., a bendable steel wire). It should also be appreciated that the attachment clip 200 of the may be shaped or designed in other configurations in accordance with the present disclosure (e.g., a modified U-shape, triangular, so on).

Figure 7:
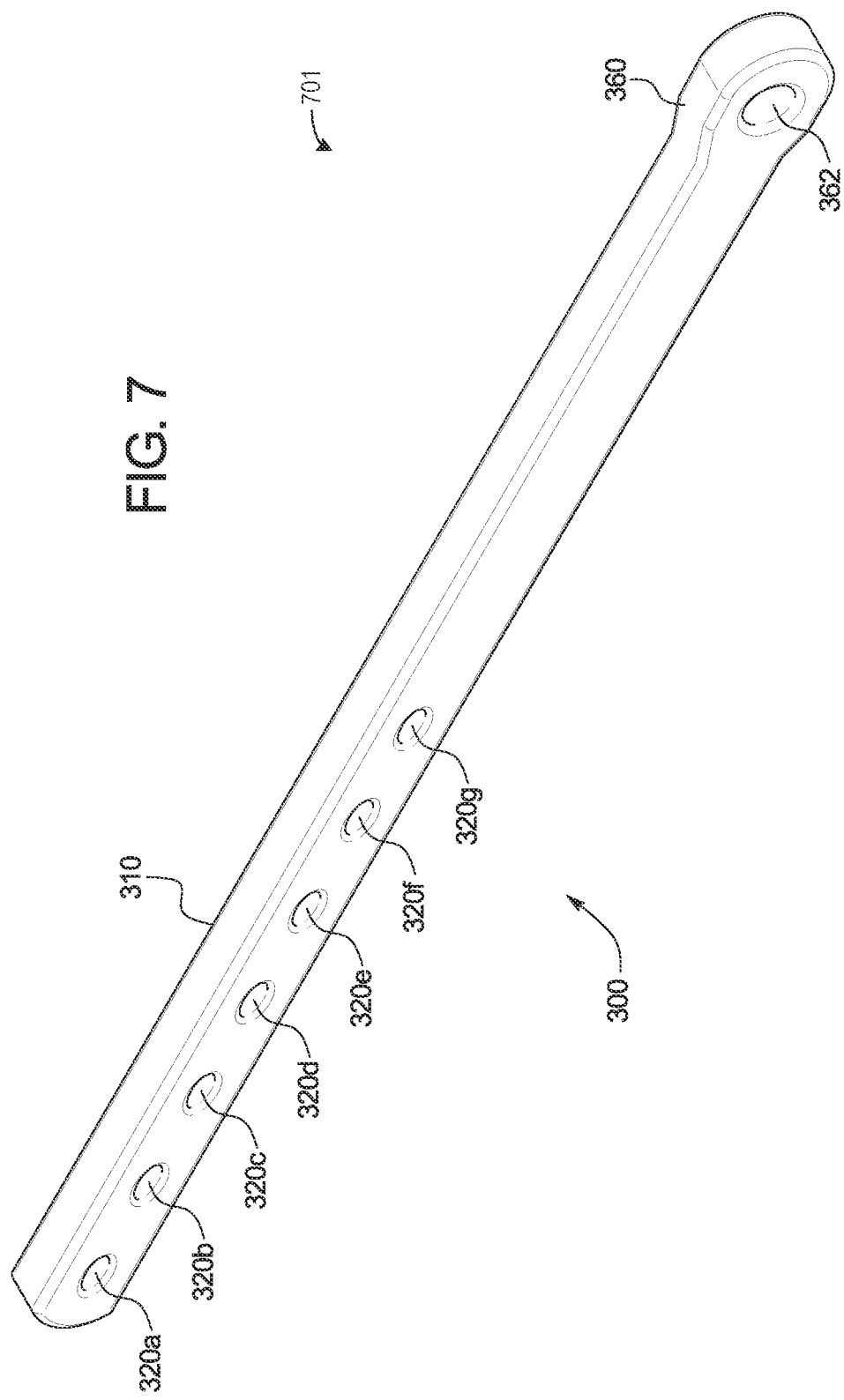
FIG. 7 shows an enlarged perspective view of the elastic support of the hose hanger of FIG. 1.

Turning now to FIGS. 7-9, FIG. 7 is an enlarged perspective view 701 of the elastic support 300 of the hose hanger 100, FIG. 8 is an enlarged side view 801 of the elastic support 300, and FIG. 9 is an enlarged top view 901 of the elastic support 300. The elastic support 300 may include a first section 310 and a second section 330 integrally connected to the first section 310. The first section 310 may include a plurality of inner surfaces 320a, 320b, 320c, 320d, 320e, 320f, and 320g that define a plurality of openings. The plurality of openings may, in part, facilitate stretching of the first section 310. The openings may also be configured to receive an arm of the attachment clip 200 at different positions along the first section 310 (e.g., an arm of the attachment clip 200 may be inserted through a first opening defined by surface 320a, an arm of the attachment clip 200 may be inserted through a second opening defined by surface 320b, and so on) to enable adjustment of the overall length of the hose hanger 100 as desired.

The second section 330 may extend from the first section to a third section 360. The third section 360 may include an inner surface 362 that defines an opening (not labeled). The opening may, in part, facilitate stretching of the third section 360. The opening may also be configured to receive part of the carabiner assembly connector 400 (as shown in FIGS. 1-3) to enable attachment of the carabiner assembly connector 400 to the elastic support 300. The first, second, and third sections of the elastic support 300 of hose hanger 100 may be integrally connected and monolithically formed. The elastic support may be made from suitable materials in accordance with the present disclosure. In some embodiments, the elastic support 300 may be comprised of a stretchable vulcanized rubber. Further, it should be appreciated that the elastic support 300 may be formed in other configurations in accordance with the present disclosure. In some embodiments, the elastic support 300 may be comprised of more or less than three sections. In some embodiments, the elastic support 300 may deviate from a uniform height.

In one example, the elastic support 300 is a high strength elastomer with a tensile strength greater than a threshold tensile strength. In one example, the threshold tensile strength is equal to about 4 kilopounds per square inch (ksi). In one example, the elastic support 300 includes a thermoplastic urethane.

The elastic support according to the present disclosure demonstrates an improved performance strength when subjected to a reaction force, as compared to the examples in the prior art. Performance strength may be evaluated according to the Maximum Loat Test set forth in AAR standard S-4006.

According to standard S-4006, under section 4.2 Load Tests, a hose strap is required to meet certain load requirements. Under Permanent Set Tests, the OAL length (the length of the strap plus the one end of the clip to the end of the other at the other end of the strap) of a test hose strap with 5 lbs attached is measured, "Initial Length," then a straight load pull of 25 lbs is attached to the test hose strap for 120 hours without stretching more than 1.0 inch. The load is then removed, the OAL length measured after a waiting period of less than 2 hours, "Length After 120 HR Load," and the length compared to the Initial Length. The difference between the Initial Length and the Length After 120 HR Load is known as the "Permanent Set" and should not exceed 0.5 inches.

For meeting the Maximum Load Tests, a flexible hose strap capable of stretching 10 or more inches must be able to lift 300 lbs off of the ground for a minimum of ten times without tearing in a period of 15-20 minutes. If the strap material is less flexible, and stretches less than 10 inches, the test is required to be conducted with a heavier weight, set forth in the standard. To determine the stretch, the hose strap is loaded vertically with a 5 lb weight and its OAL length measured as "Length Base Measurement." The 5 lb weight is removed and a 300 lb load is attached to the hose strap and the OAL length measured as "Length Under 300 lb." The difference between the two is the stretch. In the case of a strap material stretching at least 10 inches, the hose strap must be able to lift 300 lbs off of the ground for a minimum of ten times without tearing in a period of 15-20 minutes. As noted in the Standard, more rigid materials are subjected to higher test loads. The heavy load is then removed, and a 5 lb weight attached. The "Permanent Set" is then calculated by measuring the difference between the OAL length with the 5 lb weight attached and the Length Base Measurement. The Permanent Set must not exceed 0.5 inches.

A hose strap according to the present disclosure including the elastic support 300 was tested for permanent set test (PST) and maximum load test (MLT) according to AAR Standard S-4006 and was found to exceed the requirements. Four similar sample hose straps were tested and the results are presented in Table 1 below

TABLE 1

| Test Step | Sample 1 | Sample 2 | Sample 3 | Sample 4 |
|---|---|---|---|---|
| Width Nominal (inches | 0.182 | 0.182 | 0.182 | 0.182 |
| Thickness (inches) | 0.1581 | 0.1568 | 0.1645 | 0.1651 |
| Tensile strength at break (psi) | 6030 | 6140 | 5980 | 6470 |
| Tensile elongation at break (%) | 650 | 640 | 670 | 710 |
| Mean | | | 6160 | 670 |
| Standard Deviation | | | 220 | 30 |

During the testing, to determine an integrity of the elastic support 300, the elastic support was stretched via steel hooks to a length of 120% of an initial rest state length. The stretched elastic support was subjected to an ozone generator for 50 hours at 100° F. The stretch elastic support was then subjected to a 5% neutral pH salt fog at 95° F. for 168 hours. A coupling mechanism was passed through the elastic support, such as a carabiner, and from the coupling mechanism a 25 lbM weight was hung. After 120 hours, 20 lbM of the 25 lbM was removed and the elastic support was measured.

The elastic support, following the stretching described above, was coupled via the attachment clip 200 at a first end to a Morehouse load cell. The elastic support, along with the attachment clip 200 were repeatedly loaded an electric winch cable attached to a carabiner anchor at a second end, opposite the first end. The load applied to the elastic support was greater than 300 lbF and stretch the elastic support greater than a threshold extension. That is to say, the elastic support exhibits a maximum load failure of greater than 300 lbs according to American Association of Railroads (AAR) Standard S-4006. In one example, the threshold extension was 10 inches. Following the repeated loading (e.g., executed 10 or more times), the 5 lbM was hung from the elastic support and it was again measured to determine its integrity.

A change in length of the elastic support was compared to a standard length change dictated by the AAR. In one example, the standard length change is equal to values greater than 0.5 inches. The elastic support of the present disclosure displayed length changes between 0.438 inches to 0.500 inches, thereby meeting the standards provided by the AAR. Sample 2 was not tested as it was used as a length gauge.

In one example, the hose hanger 100, which may include the elastic support comprising a tensile strength greater than or equal to 4 KSI and a material property elongation percent at break being greater than 640%, may include some advantages. For example, the combination of the tensile strength and the material property elongation percent at break may increase a durability and a longevity of the hose hanger 100. The elastic support may further reduce movement of the hose hanger 100. Whipping, oscillating and other movements due to wind, rail conditions, and the like may be reduced based on the combination of the tensile strength and the material property elongation percent at break of the elastic support. Furthermore, contact between the hose hanger 100 and debris may be reduced via the more stationary state of the elastic support.

Turning now to FIGS. 10-12, FIG. 10 shows an enlarged perspective view 1001 of the carabiner assembly connector 400 and the carabiner assembly 500 of the hose hanger 100. FIG. 11 shows an enlarged top view 1101 of the carabiner assembly connector 400 and the carabiner assembly 500. FIG. 12 shows an enlarged side view 1201 of the carabiner assembly connector 400 and the carabiner assembly 500. The carabiner assembly connector 400 may be comprised of an elongated flexible member (e.g., an elongated flexible polyester web strap) connected by a plurality of fasteners (e.g., rivets). The elongated flexible member may be looped about itself after attachment to the elastic support 300 and the carabiner assembly 500. For example, the carabiner assembly connector 400 may include an elongated flexible strap that forms a central section 410, a first connector 440, and a second connector 470 when looped and secured by fasteners.

As further shown in FIGS. 13-15, the elongated flexible strap may include a first portion 412, a second portion 414, a third portion 416, a fourth portion 418, and a fifth portion 420. FIG. 13 shows an enlarged perspective view 1301 of the carabiner assembly connector 400, FIG. 14 is an enlarged top view 1401 of the carabiner assembly connector 400, and FIG. 15 is an enlarged side view 1501 of the carabiner assembly connector 400.

The central section 410 may include the first portion 412 of the elongated flexible strap, the third portion 416 of the elongated flexible strap, and the fifth portion 420 of the elongated flexible strap. The central section 410 may also include a stitching configured to securely connect the first portion 412, the third portion 416, and the fifth portion 420 to each other when the elongated flexible strap is looped about itself after attachment to the elastic support 300 and the carabiner assembly 500. The first connector 440 may be configured to be attached to the elastic support 300 and particularly to the third section 360 of the elastic support 300. The first connector 440 may include the fourth portion 418 of the elongated flexible strap and be configured to form a loop. The second connector 470 may be configured to be attached to the carabiner assembly 500 and particularly to a ring 570 of the carabiner assembly 500. The second connector 470 may include the second portion 414 of the elongated flexible strap and be configured to form a loop.

In some embodiments, the carabiner assembly connector 400 may be substantially inelastic. In some embodiments, the carabiner assembly connector 400 may be partially elastic in accordance with the present disclosure. It should also be appreciated that the carabiner assembly connector 400 may be alternatively configured and sized in accordance with the present disclosure. In some embodiments, the carabiner assembly connector 400 may be comprised of another suitable material that is not an elongated flexible strap. In some examples, the carabiner assembly connector 400 may be comprised of a coated wire. In some examples, the carabiner assembly connector 400 may be comprised of a flexible braided steel wire. In some embodiments, the carabiner assembly connector 400, when in a looped and fastened configuration, may have an overall length between four to six inches. In some embodiments, the carabiner assembly connector 400, when in a looped and fastened configuration, may another suitable length (e.g., longer than six inches, shorter than four inches).

In one example, the carabiner assembly connector 400 is a webbing. The webbing may comprise polyester. The webbing may be sewn, which may increase a tensile strength of the carabiner assembly connector 400. The webbing may comprise a length greater than 3 inches, a width greater than half an inch, and a thickness of about 0.05 inches. The tensile strength may be configured to hold approximately 800 pounds.

Returning to FIGS. 10-12, the carabiner assembly 500 may be comprised of a carabiner 505 and a ring 570 connected to the carabiner 505. In one example, the ring 570 is crimped into the carabiner 505 to mitigate cross loading. The carabiner 505 may include a straight section 510, a first curved section 520 connected at a first end of the straight section 510, and a second curved section 530 at a second end of the straight section 510. Further, the carabiner 505 may include a gate engagement member 550 pivotally connected by a pivot pin 560 to the first curved section 520 and biased by a spring (not shown) to a closed position in contact with a gate engagement terminus 540 located at the end the second curved section 530. The ring 570 may be suitably fixedly attached to the first curved section 520 (e.g., via welding, a bolt system) and comprised of a suitable material (e.g., steel). In some embodiments, the carabiner assembly 500 may be D, oval, pear, or otherwise suitable shaped. In some embodiments, the gate engagement member 550 of the carabiner assembly 500 may be straight, bent, comprised of a wiregate, or otherwise suitably designed to allow for the hose hanger 100 to be connected to a glad hand of an air hose of a railroad car or another functional component of a hose system assembly.

Referring now to FIG. 16, it shows an enlarged side view 1601 of two units of a multiunit vehicle illustrating two hose hangers as described in FIGS. 1-15 supporting two adjacent air hoses attached to the two units. A first vehicle unit 20 and a second vehicle unit 40 (e.g., two railroads cars) are shown with respect to a path 10 (e.g., a railroad track). A first hose hanger 100a may be used to support a first air hose 24 coupled to the first vehicle unit 20. The attachment clip 200 of the first hose hanger 100a may attach to a fitting 30 extending downward from a coupler 22 of the first vehicle unit 20 and the carabiner assembly 500 may attach to fitting 28 extending upward from a glad hand connector 26 attached to the first air hose 24 of the first vehicle unit 20. In this position, the first air hose 24 is held in an elevated position relative to the ground (not shown), the path 10, and the coupler 22 (e.g., closer to the coupler 22 than the path 10). Similarly, a second hose hanger 100b may be used to support a second air hose 44 coupled to the second vehicle unit 40. The attachment clip 200 of the second hose hanger 100b may attach to a fitting 50 extending downward from a coupler 42 of the second vehicle unit 40 and the carabiner assembly 500 may attach to fitting 48 extending upward from a glad hand connector 46 attached to the second air hose 44 of the second vehicle unit 40.

In this way, the hose hanger of the present disclosure may maintain air hoses at a desired height. For example, when utilized with cars of a train, the hose hanger may maintain the end of air hoses involved in pneumatic braking a suitable distance above the track, with the carabiner assembly eliminating the possibility of cross loading (e.g., lateral and longitudinal loading). Thus, the hose hanger may have a prolonged life as compared to current hose hanger systems. Further, the hose hanger of the present disclosure provides a simpler method of attachment to the glad hand end as compared to the wire clips of the hose hangers of the prior art. It should also be appreciated that the hanger of the present disclosure can be used in other implementations (e.g., for purposes other than hanging pneumatic braking system hoses) in the railroad industry and in other industries. It will be understood that modifications and variations may be effected without departing from the scope of the novel concepts of the present invention, and it is understood that this application is to be limited only by the scope of the claims.

FIGS. 1-16 show example configurations with relative positioning of the various components of the hose hanger disclosed herein. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. FIGS. 1-16 are drawn to scale although other relative dimensions may be used.

The disclosure provides support for a hose hanger including an elastomeric material with a material property tensile strength greater than 4 kilopound per square inch (KSI). A first example of the hose hanger further includes an attachment clip, wherein the elastomeric material is connected to the attachment clip, a carabiner assembly, and a carabiner assembly connector connected to the elastomeric material and the carabiner assembly, wherein the elastic support includes: a first section; a second section integrally connected to the first section, and a third section integrally connected to the second section, and wherein the elastic support is uniform in width. A second example of the hose hanger, optionally including the first example, further includes where the first section includes a plurality of inner surfaces that define a plurality of openings. A third example of the hose hanger, optionally including one or more of the previous examples, further includes where the plurality of openings is configured to receive an arm of the attachment clip, and wherein the plurality of openings is arranged at different positions along the first section. A fourth example of the hose hanger, optionally including one or more of the previous examples, further includes where the second section is a transition section that is uniform in height from the first section toward and to the third section, wherein the third section includes an inner surface that defines an opening configured to receive part of the carabiner assembly connector. A fifth example of the hose hanger, optionally including one or more of the previous examples, further includes where the first, second, and third sections of the elastic support comprise a stretchable vulcanized rubber, and wherein the elastic support exhibits a maximum load failure of greater than 300 lbs, according to AAR Standard S-4006. A sixth example of the hose hanger, optionally including one or more of the previous examples, further includes where the carabiner assembly connector includes an elongated flexible member. A seventh example of the hose hanger, optionally including one or more of the previous examples, further includes where the elongated flexible member is inelastic. An eighth example of the hose hanger, optionally including one or more of the previous examples, further includes where the elongated flexible member includes an elongated flexible polyester web strap. A ninth example of the hose hanger, optionally including one or more of the previous examples, further includes where the elongated flexible member includes a first portion, a second portion, a third portion, a fourth portion, and a fifth portion, wherein the fourth portion is attached to the elastic support and the second portion is attached to the carabiner assembly, and wherein the first, third, and fourth portions are attached together via a stitching. A tenth example of the hose hanger, optionally including one or more of the previous examples, further includes where the elongated flexible member comprises a central section, a first connector connected to the elastic support, and a second connector connected to the carabiner assembly. A eleventh example of the hose hanger, optionally including one or more of the previous examples, further includes where the carabiner assembly comprises a carabiner and a ring connected to the carabiner, wherein the carabiner assembly connector is connected to the ring. A twelfth example of the hose hanger, optionally including one or more of the previous examples, further includes where the hose hanger maintains an air brake hose of a vehicle at a predetermined height above a supporting road bed structure.

The disclosure further provides support for a hose hanger including an attachment clip, an elastic support made from a stretchable vulcanized rubber and connected to the attachment clip with a material property tensile strength greater than 4 kilopound per square inch (KSI), a carabiner assembly; and a carabiner assembly connector connected to the elastic support, connected to the carabiner assembly, and connecting the elastic support and the carabiner assembly, the carabiner assembly connector including a substantially inelastic elongated flexible member, wherein the elongated flexible member includes: a central section: a first connector connected to the elastic support; and a second connector connected to the carabiner assembly. A first example of the hose hanger further includes where the elongated flexible member is comprised of an elongated flexible polyester web strap. A second example of the hose hanger, optionally including the first example, further includes where the elongated flexible member includes a first portion, a second portion, a third portion, a fourth portion, and a fifth portion, wherein the fourth portion is attached to the elastic support and the second portion is attached to the carabiner assembly, and wherein the first, third, and fourth portions are attached together by a plurality of fasteners. A third example of the hose hanger, optionally including one or more of the previous examples, further includes where the carabiner assembly is comprised of a carabiner and a ring connected to the carabiner, and wherein the carabiner assembly connector is connected to the ring. A fourth example of the hose hanger, optionally including one or more of the previous examples, further includes where the hose hanger maintains an air brake hose of a vehicle at a predetermined height above a supporting road bed structure.

The disclosure further provides support for a system including a hose hanger having an attachment clip, an elastic support comprising a stretchable vulcanized rubber and with a material property tensile strength greater than 4 kilopound per square inch (KSI), the elastic support connected to the attachment clip, wherein the attachment clip extends through one of a plurality of openings of the elastic support, a carabiner assembly, and a carabiner assembly connector connected to the elastic support, connected to the carabiner assembly, and connecting the elastic support and the carabiner assembly, the carabiner assembly connector including a substantially inelastic elongated flexible member, wherein the elongated flexible member includes: a central section: a first connector connected to the elastic support; and a second connector connected to the carabiner assembly. A first example of the system further includes where the hose hanger extends from a glad hand connector to an air brake hose support, wherein the carabiner extends through the glad hand connector and the attachment clip extends through the air brake hose support, the system further comprising a hose hanging from the hose hanger.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A rail hose hanger comprising:
an elastic support configured to be connectable at a first end to a coupler of a railroad car and at a second end to a glad hand of an air hose of the railroad car, the elastic support being a high strength elastomer material with a material property tensile strength greater than 5.980 kilopound per square inch (KSI) and a material property elongation percent at break of greater than 640, wherein the elastic support is configured to support the air hose of the railroad car when so connected; and
an attachment clip, wherein the high strength elastomer material is connected to the attachment clip, a carabiner assembly, and a carabiner assembly connector connected to the high strength elastomer material and the carabiner assembly, wherein the elastic support includes: a first section; a second section integrally connected to the first section, and a third section integrally connected to the second section, and wherein the elastic support is uniform in width, wherein the carabiner assembly connector includes an elongated flexible member.

2. The rail hose hanger of claim 1,
wherein the elastic support is uniform in thickness.

3. The rail hose hanger of claim 2, wherein the first section includes a plurality of inner surfaces that define a plurality of openings.

4. The rail hose hanger of claim 3, wherein the plurality of openings is configured to receive an arm of the attachment clip, and wherein the plurality of openings is arranged at different positions along the first section.

5. The rail hose hanger of claim 2, wherein the second section is a transition section that is uniform in height from the first section toward and to the third section, wherein the third section includes an inner surface that defines an opening configured to receive part of the carabiner assembly connector.

6. The rail hose hanger of claim 2, wherein the elastic support exhibits a maximum load failure of greater than 300 lbs, according to AAR Standard S-4006.

7. The rail hose hanger of claim 2, wherein the high strength elastomer material has a material property elongation percent at break of greater than about 650.

8. The rail hose hanger of claim 7, wherein the material property elongation percent at break is greater than 710.

9. The rail hose hanger of claim 7, wherein the material property elongation percent at break is greater than 640.

10. The rail hose hanger of claim 7, wherein the elongated flexible member comprises a central section, a first connector connected to the elastic support, and a second connector connected to a carabiner assembly.

11. The rail hose hanger of claim 1, wherein the elongated flexible member comprises a central section, a first connector connected to the elastic support, and a second connector connected to a carabiner assembly.

* * * * *